United States Patent

Leitnaker et al.

Patent Number: 5,885,326
Date of Patent: Mar. 23, 1999

[54] PROCESS FOR REMOVING TECHNETIUM FROM IRON AND OTHER METALS

[75] Inventors: James M. Leitnaker, Kingston; Lee D. Trowbridge, Oak Ridge, both of Tenn.

[73] Assignee: The United States of America as represented by the United States Department of Energy, Washington, D.C.

[21] Appl. No.: 884,128

[22] Filed: Jun. 27, 1997

[51] Int. Cl.$^6$ .............................. C21C 1/04; C22B 60/00

[52] U.S. Cl. .................. 75/562; 588/1; 423/DIG. 12

[58] Field of Search .................... 75/562; 588/1; 423/DIG. 12

[56] References Cited

U.S. PATENT DOCUMENTS

| | | | |
|---|---|---|---|
| 2,501,138 | 3/1950 | Parker | 75/562 |
| 5,348,567 | 9/1994 | Chappell | 75/10.66 |
| 5,724,669 | 3/1998 | Snyder et al. | 75/10.14 |
| 5,732,366 | 3/1998 | Haas | 75/10.46 |

OTHER PUBLICATIONS

M. Hansen, *Constitution of Binary Alloys*, 2nd Edn, McGraw–Hill Book Co., Inc. New York, 1958, p. 665.

F.A. Shunk, *Constitution of Binary Alloys*, 2nd Supplement, McGraw–Hill Book Co., Inc. New York, 1969, p. 351.

M. Hansen, *Constitution of Binary Alloys*, 2nd Edn, McGraw–Hill Book Co., Inc. New York, 1958, p. 702.

*Primary Examiner*—Melvyn Andrews
*Attorney, Agent, or Firm*—Emily G. Schneider; Stephen D. Hamel; William R. Moser

[57] ABSTRACT

A process for removing technetium from iron and other metals comprises the steps of converting the molten, alloyed technetium to a sulfide dissolved in manganese sulfide, and removing the sulfide from the molten metal as a slag.

3 Claims, 4 Drawing Sheets

1. Add Mn to Tc-contaminated Fe (or other metal)

2. Melt the mixture

3. Add sulfur (e.g., as FeS) to the melt

4. Remove MnS slag containing dissolved Tc sulfide

5. Add slight excess Mn to remove residual sulfur

6. Remove MnS slag

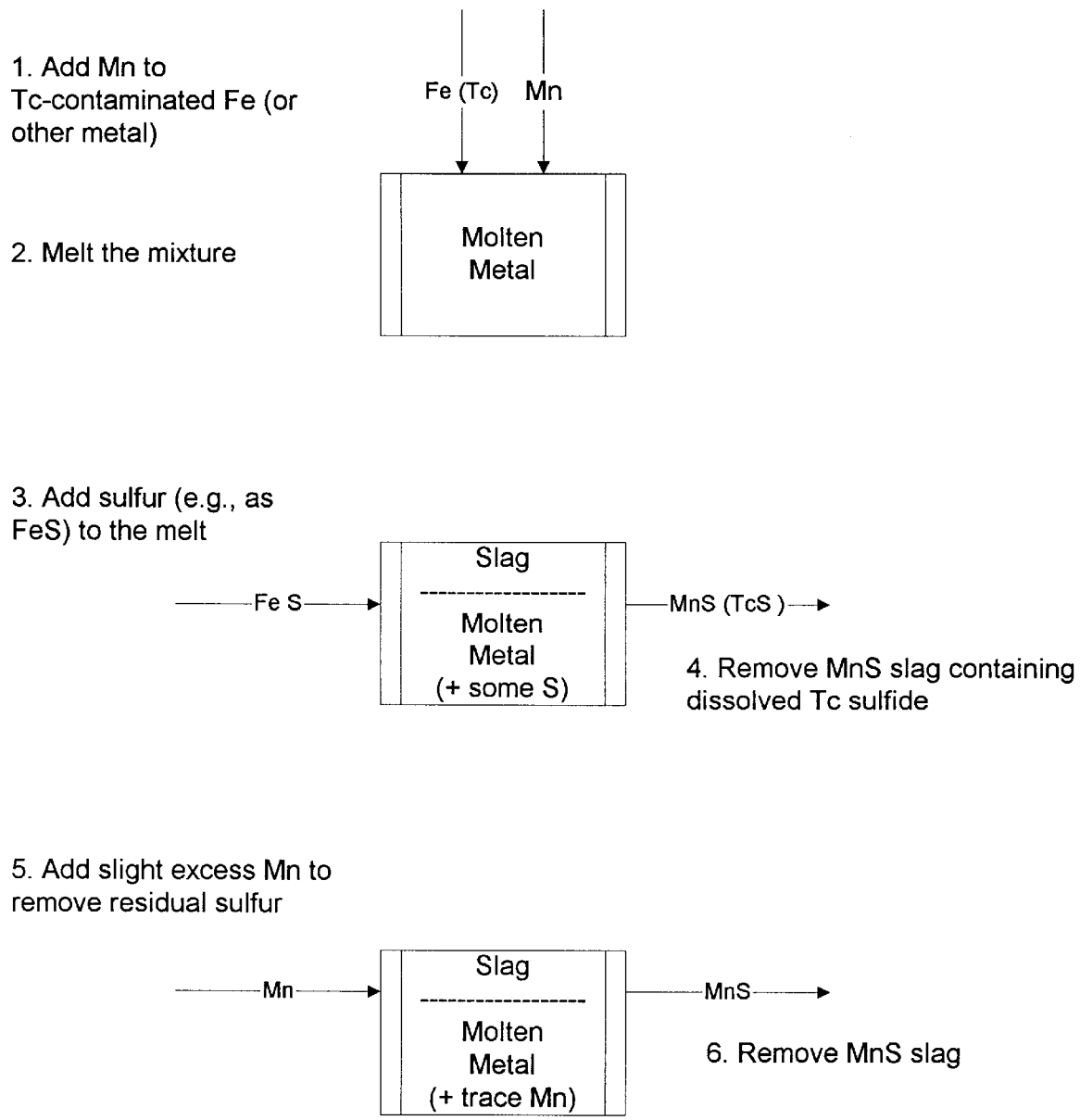
Figure 4 - Schematic of Process

needs to be viewed.

PROCESS FOR REMOVING TECHNETIUM FROM IRON AND OTHER METALS

This invention was made with Government support under contract DE-AC05-84OR21400 awarded by the U.S. Department of Energy to Lockheed Martin Energy Systems, Inc. and the Government has certain rights in this invention.

FIELD OF THE INVENTION

The present invention relates to processes for removing impurities from metals, and more particularly to a process for removing technetium from iron and similar metals without dissolving the contaminated metal and removing the technetium electrolytically.

BACKGROUND

Technetium is a radioactive product of the nuclear fission process. During reprocessing of spent or partially spent fuel from nuclear reactors, the technetium can be released and contaminate other, otherwise good, metals. A specific example is equipment in gaseous diffusion uranium enrichment cascades which have been used to process fuel which was returned from reactors, so-called reactor returns. These returns contained volatile technetium compounds which contaminated the metals in the equipment. Present regulations require that technetium be removed before the metal can be re-used at non-radioactive sites.

Removal of sulfur from steel by the addition of small quantities of manganese is well known. Sulfur tends to concentrate at the grain boundaries, and is an embrittling agent. Thus, the removal of sulfur during the steelmaking process is important to the usefulness of steel. The sulfur removal process uses an alloying element to remove an undesirable element. Sulfur is removed to extremely low levels, while a small excess of the alloying element remains in the steel without damage to its properties.

In addition to the market value of the decontaminated and reprocessed metals, savings can be realized by not having to bury contaminated metals in land fills or store them by some other means. For example, the cost of burying household garbage currently is approximately $85 per ton. Even if the nearby landfills would accept radioactively contaminated metals, the cost would be unacceptable.

Removing the technetium from contaminated metals has two desirable results: First, the large amount of nonradioactive metal produced by the process herein described can be recycled at a much lower cost than virgin metal can be produced. Second, large amounts of radioactively contaminated metal can be reduced to relatively small amounts of radioactive slag and large amounts of essentially uncontaminated metal.

OBJECTS OF THE INVENTION

Accordingly, it is an object of the present invention to provide a new and improved process for removing technetium from iron and other metals.

It is another object to avoid the necessity of current-technology methods such as dissolving metals contaminated with technetium, with the attendant cost of dissolving chemicals, and the subsequent cost of re-refining the metal. It is yet another object to avoid the necessity and cost of burying contaminated metals in landfills, or storing them by other means.

Further and other objects of the present invention will become apparent from the description contained herein.

SUMMARY OF THE INVENTION

In accordance with one aspect of the present invention, a new and improved process for removing technetium contamination from iron and other metals and alloys comprising the steps of: providing an amount of metal contaminated with technetium; adding an amount of manganese to the amount of technetium-contaminated metal between about $\frac{1}{10}$ atom % manganese and 5 atom % manganese relative to the contaminated metal to form a mixture; melting the mixture to provide a homogeneous distribution of the manganese and the technetium to form a molten solution; and adding sulfur, preferably in the form of a sulfide of iron, to the molten solution to precipitate manganese and technetium as a sulfide slag, and to produce a reduced-technetium molten metal.

BRIEF DESCRIPTION OF THE DRAWINGS

In the drawings:

FIG. 4 is a diagram showing the process for removing technetium from iron and other metals.

Figure 1:
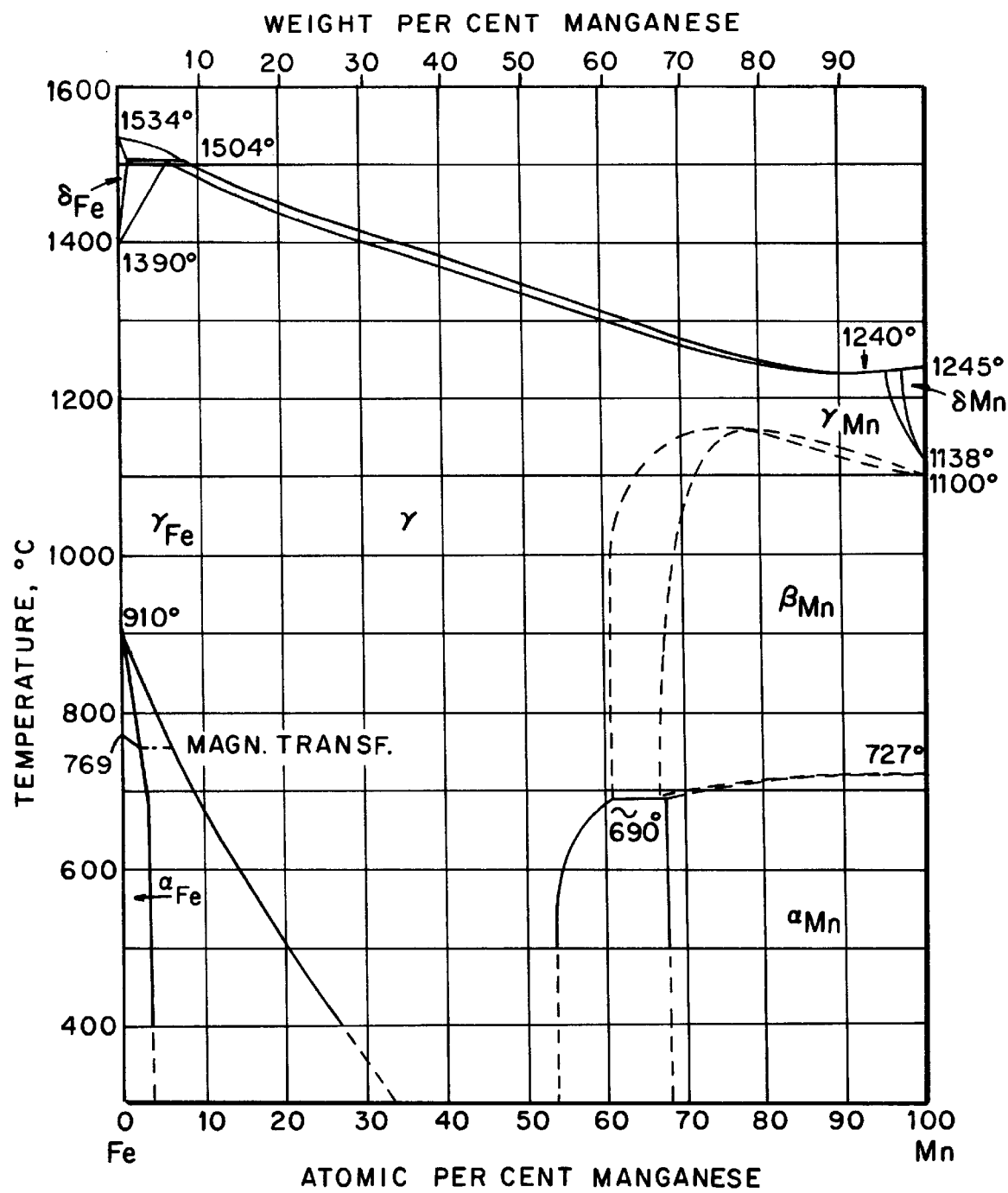
FIG. 1 is an Iron-Manganese Temperature-Composition Phase Diagram.

For a better understanding of the present invention, together with other and further objects, advantages and capabilities thereof, reference is made to the following disclosure and appended claims in connection with the above-described drawings.

DETAILED DESCRIPTION OF THE INVENTION

As is indicated by the positions of manganese (Mn) and technetium (Tc) in the periodic table of the elements, there are strong similarities in their chemistry. This similarity is useful in removing technetium from iron alloys and, by extension, from nickel alloys as well, as long as the content of additional alloying elements is not so great as to hamper the chemical relationships.

Manganese is used in the steel industry to remove sulfur, an embrittling agent, from steel. The free energy of formation of manganese sulfide (MnS) is sufficiently negative to precipitate nearly all of the sulfur. Further aid is obtained by the addition of small amounts of more active elements, such as titanium (Ti). In the same way that manganese removes the sulfur, the sulfur can be used to remove the manganese. Because manganese and technetium are in the same family of the periodic table, the technetium sulfide and the manganese sulfide may be expected to behave similarly and, at least when the manganese sulfide is in marked excess, to be completely soluble in one another.

Hence, the procedure is to add manganese to the contaminated metal, between $\frac{1}{10}$ atom % and 5 atom % manganese, and preferably about 1 atom % manganese, these percentages being relative to the contaminated metal. Then melt the contaminated alloy and the manganese and agitate as required to provide a homogeneous distribution of the manganese and technetium. Then add sufficient amounts of sulfur, preferably in the form of a sulfide of iron, to the melt to precipitate the manganese and technetium as a sulfide slag. An excess of iron in the iron sulfide addition will not be harmful to the process. An excess of sulfur may result in early loss of the sulfur through vaporization. Removal of the slag using the standard smelter procedure must be done carefully. In pig iron, for example, the sulfur—bound in an Mn,FeS phase—is frequently found as an inclusion. The compound MnS has about half the density of iron, however, and its melting point is above that of iron. The reduced-technetium molten metal is further processed using methods well-known in the art.

Sulfur can be added into the melt in any of several chemical forms, so long as associated elements do not interfere with subsequent processes or purity requirements. The optimal additive containing sulfur for iron purification is expected to be FeS, particularly in its iron-rich form, as that compound would merely add more iron to the mix in addition to the desired sulfur. For nickel purification, the corresponding additive would be nickel sulfide. Other sulfides, elemental sulfur, or sulfur containing gases could be used instead, so long as they did not present technical difficulties such as compromising the desired end composition of the metal or loss of sulfur containing gases during the mixing process.

The amount of technetium left in the metal produced by this process is controlled as desired by controlling the amount of manganese and iron sulfide added. Optimum amounts of both manganese and sulfur (e.g., as iron sulfide) required must be determined from the amount of technetium which is permitted to remain in the alloy, and from determinations of solubility constants.

The chemical reaction to remove Technetium dissolved in iron and incorporate it into manganese sulfide (MnS) is expressed as follows:

$$\text{Tc(sol'n in Fe)} + \text{FeS} = \text{TcS(sol'n in MnS)} + \text{Fe}. \quad (1)$$

An understanding of the mathematics of this reaction will help understanding of the process. The Gibbs free energy change of the reaction, $\Delta G_r$, can be written as $$\Delta G_r = \Delta G_f[\text{TcS(sol'n in MnS)}] - \Delta G_f[\text{FeS}] - \Delta G_f[\text{Tc(sol'n in Fe)}]. \quad (2)$$

The individual values of the Gibbs free energy changes are determined by the equations:

$$\Delta G_f[\text{TcS(sol'n in Mn)}] = \Delta G_f^°[\text{TcS}] + RT \ln a_{TcS \ in \ MnS}, \quad (3)$$

$$\Delta G_f[\text{FeS}] = \Delta G_f^°[\text{FeS}], \text{ and} \quad (4)$$

$$\Delta G_f[\text{Tc(sol'n in Fe)}] = RT \ln a_{Tc \ in \ Fe}, \quad (5)$$

where R is the gas constant in units consistent with the units of $\Delta G$'s, T is the absolute temperature in degrees kelvin, and the a's are activities—which can be thought of as mole fractions. (Note that the free energy of formation of an element in its standard state is identically zero.) One of the driving forces for Reaction (1) will be the algebraic result of $(\Delta G_f^°[\text{TcS}] - \Delta G_f^°[\text{FeS}])$, the value for which can only be estimated. Another driving force will be the combination of the two solution terms:

$$RT \ln (a_{TcS \ in \ MnS}/a_{Tc \ in \ Fe}). \quad (6)$$

Hence, the more negative the standard Gibbs free energy of formation of TcS, relative to FeS, the more Reaction (1) is driven to the right. Likewise, the larger the activity of the TcS in the MnS, relative to the activity of Tc in Fe, the more Reaction (1) is driven to the right. One cannot change the relative values of the free energy of formation of the two sulfides, but one can improve the removal of technetium by providing more MnS in which the TcS can dissolve.

Figure 2:
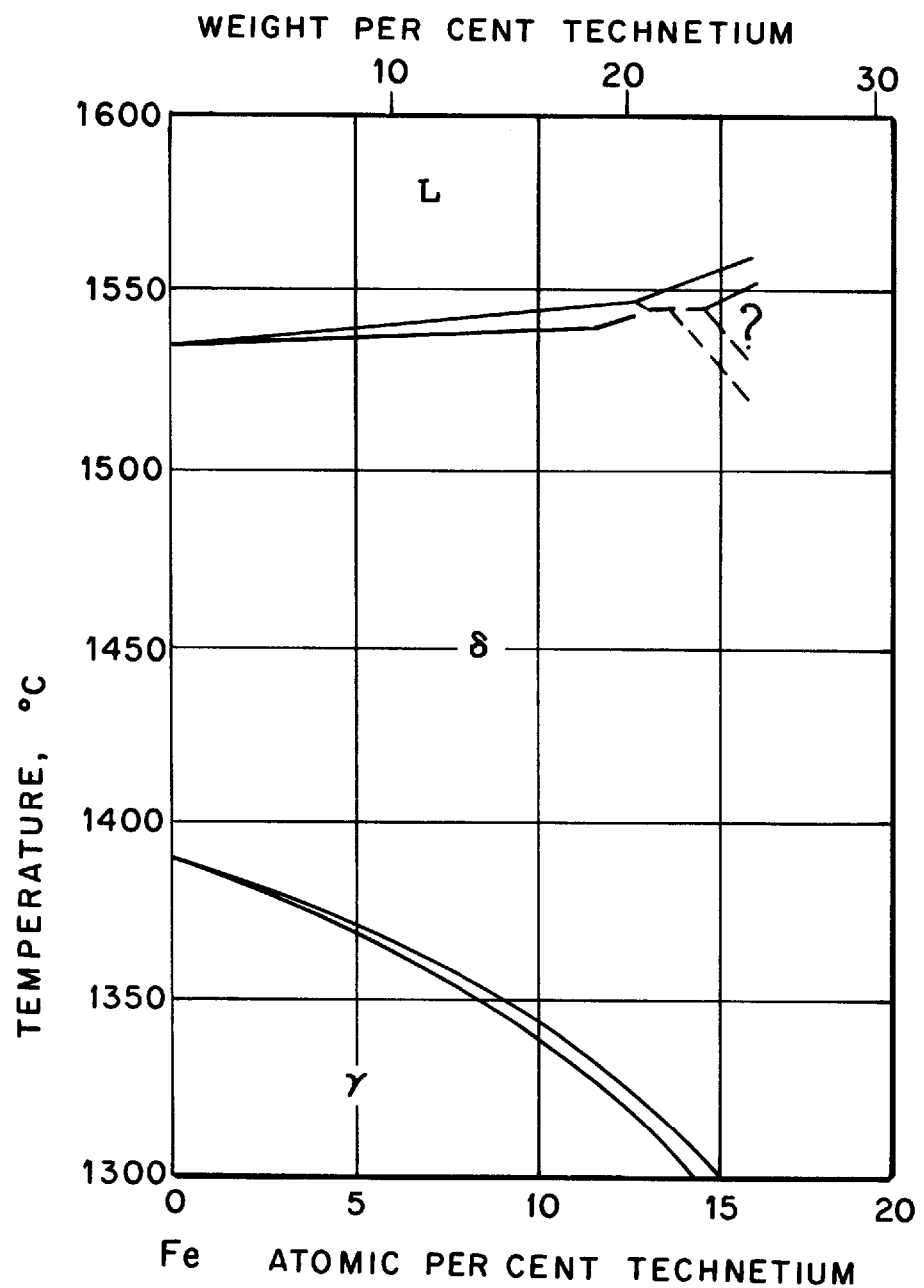
FIG. 2 is an Iron-Technetium Temperature-Composition Phase Diagram.
Figure 3:
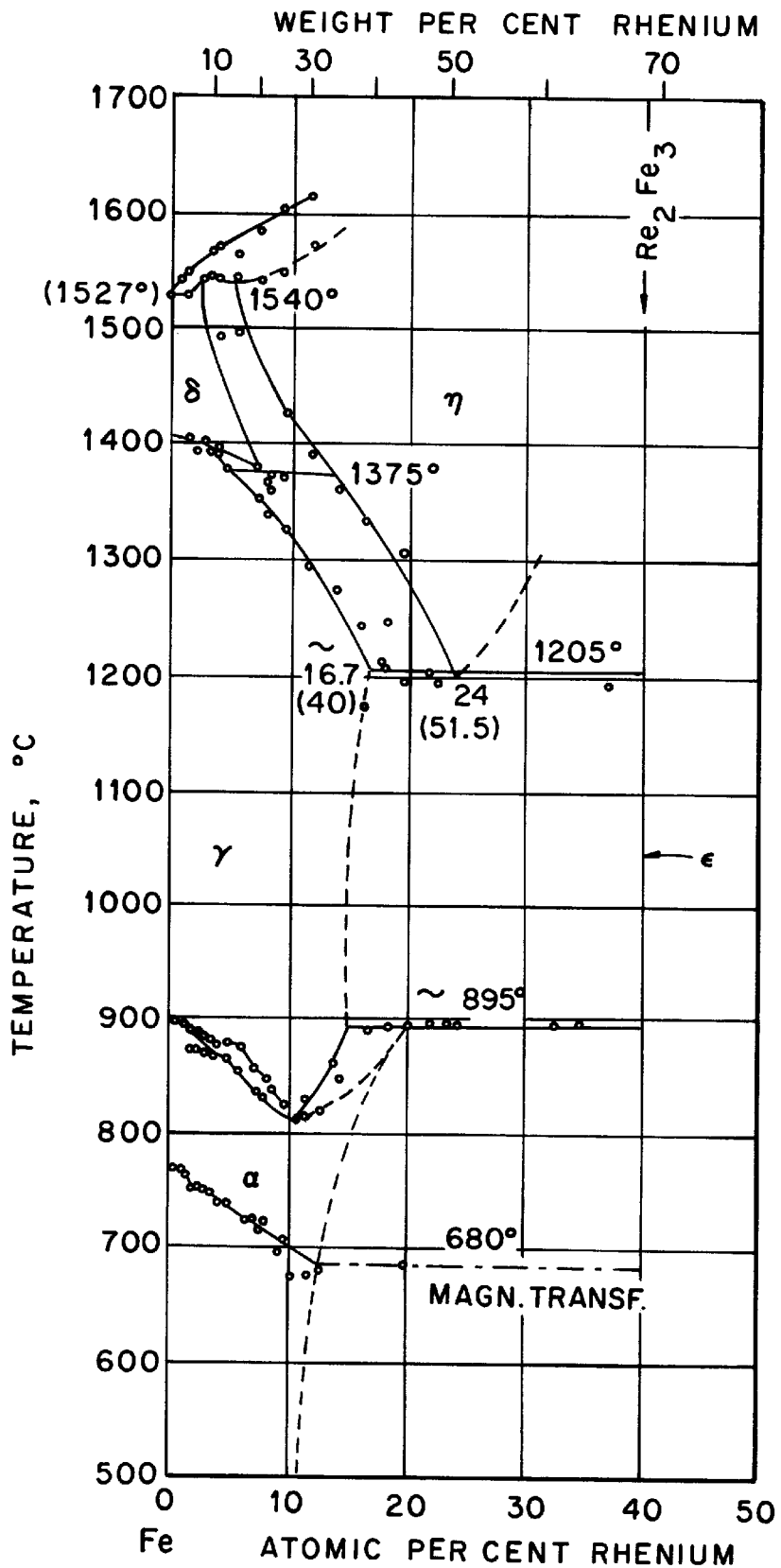
FIG. 3 is an Iron-Rhenium Temperature-Composition Phase Diagram.

In the phase diagrams of the iron-manganese, iron-technetium, and iron rhenium systems shown in the drawings as FIGS. 1, 2, and 3, it is shown in FIG. 1 that manganese dissolves in the gamma phase of iron up to more than 50 atomic percent, and in FIG. 3, that rhenium dissolves to about 15 atomic percent. Technetium can be expected to dissolve to an intermediate extent, as supported by the limited phase information shown in FIG. 2.

Manganese sulfide (MnS) is the stable sulfide of interest in the manganese-sulfur system, although manganese disulfide ($MnS_2$) is known. In the rhenium-sulfur system the monosulfide is not known, and in the technetium-sulfur system TcS is not known, but $TcS_2$ and $Tc_2S_7$ have been reported, though phase data are not available. Nevertheless, it is believed that excess manganese sulfide will dissolve any technetium-sulfur phase, because of the phase relationships described in the phase diagrams.

Thermodynamic data for relevant sulfides are given in Table 1, and are taken from the National Bureau of Standards tabulation. From that data the heat of formation of technetium sulfide (TcS) has been estimated to be intermediate between manganese sulfide, iron sulfide (FeS), and rhenium disulfide ($ReS_2$). The estimate has an unknown and large probable error. The estimate for the entropy of the technetium sulfide, 80, has a probable error of no more than about three $J\text{-deg}^{-1}\text{mol}^{-1}$.

TABLE 1

Thermodynamic Data for Some Sulfides of Interest

| Formula | $\Delta H_{298}/\text{kJ-mol}^{-1}$ | $\Delta G_{298}/\text{kJ-mol}^{-1}$ | $S_{298}/\text{kJ-mol}^{-1}\text{deg}^{-1}$ |
|---------|---|---|---|
| MnS | −214.2 | −218.4 | 78.2 |
| FeS | −100.0 | −100.4 | 60.29 |
| $FeS_2$ | −178.2 | −166.9 | 52.93 |
| $ReS_2$ | −180 | — | — |
| TcS | [−160] | | [80] |

The data in Table 1 indicate that the properties of technetium and its compounds are expected to lie intermediate between those of manganese and rhenium, an observation which also conforms to the predictability of the periodic table. Hence, it is clear that testing and development of the process may be accomplished using rhenium as a stand-in for technetium. Reducing the amount of rhenium in a sample of iron by the use of manganese and sulfur, as described, will demonstrate that technetium will also be removed in like fashion. Although the rhenium is expensive, testing and development can be accomplished without dealing with a radioactive material, and the experiments can be done in non-rad laboratories prior to actual use of technetium. Ultimately, of course, to precisely quantify the phase and thermodynamic relationships with alloys involving technetium, experiments utlizing technetium must be performed.

It should also be expected from the foregoing explanation that removal of technetium is easier and more complete than removal of rhenium. Hence, moderate lowering of a rhenium content with a given activity of manganese and sulfide will translate to greater lowering of a technetium content.

While there has been shown and described what is at present considered the preferred embodiments of the invention, it will be obvious to those skilled in the art that various changes and modifications can be made therein without departing from the scope of the invention defined by the appended claims.

What is claimed is:

1. A process for removing technetium contamination from iron and other metals and alloys comprising the steps of:

(A) Providing metal contaminated with technetium;

(B) Adding manganese to the technetium-contaminated metal to form a mixture;

(C) Melting the mixture to provide a homogeneous distribution of manganese and technetium in the metal to form a molten solution; and (D) Adding sulfur to the molten solution to precipitate manganese and technetium as a sulfide slag, and to produce a reduced-technetium molten metal.

2. A process for removing technetium contamination from iron and other metals and alloys comprising the steps of:

(A) Providing an amount of metal contaminated with technetium;

(B) Adding an amount of manganese to the amount of technetium-contaminated metal between about $\frac{1}{10}$ atom % and 5 atom % manganese relative to the contaminated metal to form a mixture;

(C) Melting the mixture to provide a homogeneous distribution of the manganese and the technetium in the metal to form a molten solution; and (D) Adding a sulfide of iron to the molten solution to precipitate manganese and technetium as a sulfide slag, and to produce a reduced-technetium molten metal.

3. A process for removing technetium contamination from iron and other metals and alloys comprising the steps of:

(A) Providing an amount of metal contaminated with technetium;

(B) Adding an amount of manganese to the amount of technetium-contaminated in the metal about 1 atom % manganese relative to the contaminated metal to form a mixture;

(C) Melting the mixture to provide a homogeneous distribution of the manganese and the technetium in the metal to form a molten solution; and (D) Adding a sulfide of iron to the molten solution to precipitate manganese and technetium as a sulfide slag, and to produce a reduced-technetium molten metal.

* * * * *